Patented Sept. 20, 1949

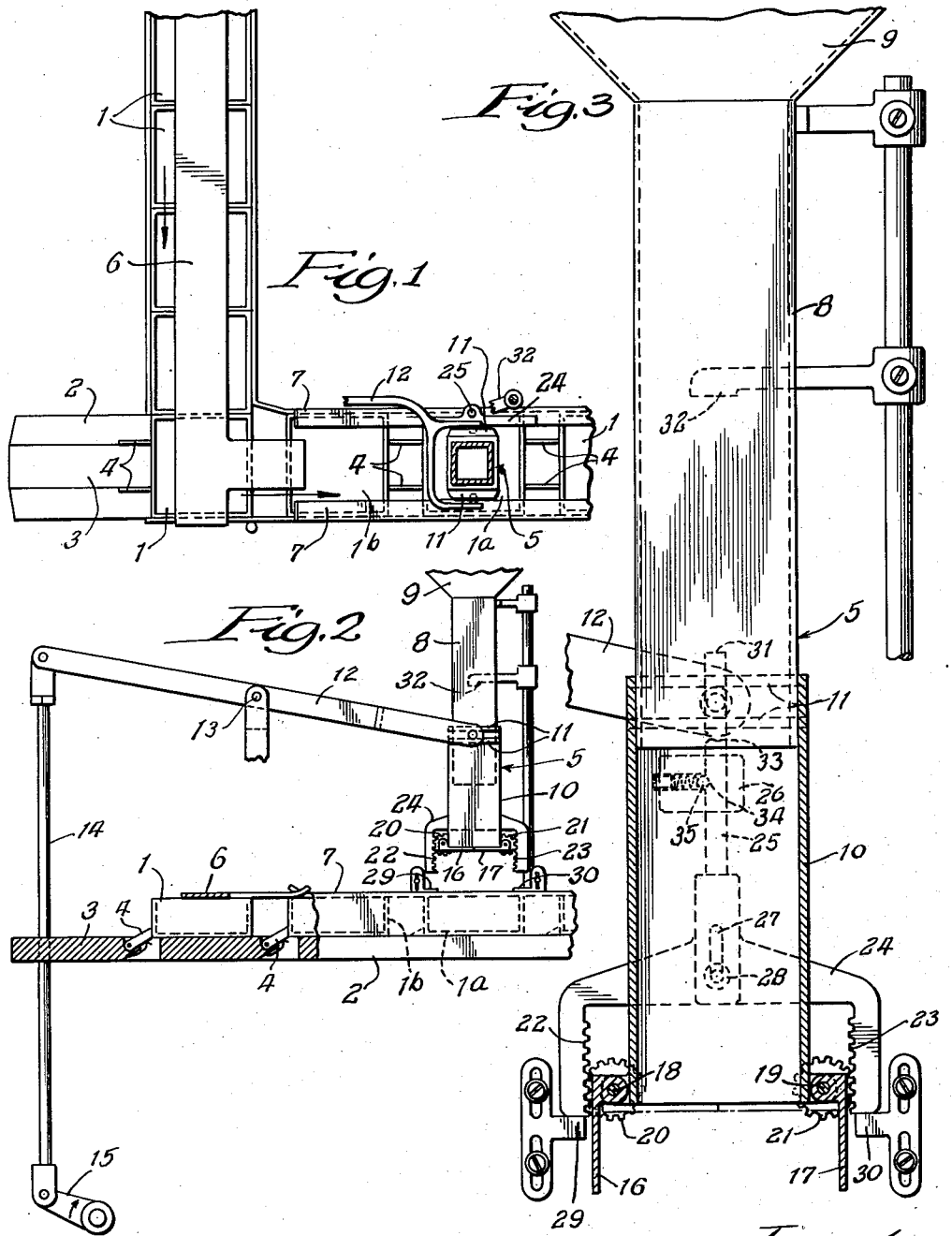

2,482,593

UNITED STATES PATENT OFFICE 2,482,593

ICE-CREAM PACKAGE FILLING MECHANISM

Frank D. Palmer, Chicago, Ill., assignor to F. D. Palmer, Inc., Chicago, Ill., a corporation of Illinois Application September 25, 1944, Serial No. 555,642

1 Claim. (Cl. 226—19)

This invention relates to improved mechanism for delivering ice cream (and other similar products) into a carton, especially in connection with package filling machinery wherein the cartons are automatically fed step by step.

In filling cartons with ice cream, the ice cream is usually in a partially frozen or semi-liquid condition and it is caused to flow under pressure through a discharge nozzle and into the carton to be filled. It is not practicable to shut off the flow of ice cream when removing a filled carton and placing an empty carton under the nozzle, and the handling of the cartons has generally been a hand operation. The operator usually works with both hands, removing a filled carton with one hand and bringing an empty carton into filling position with the other hand in an attempt to prevent spilling of any ice cream between the cartons. This practice results in considerable waste of ice cream and packages are not always filled to the required extent causing additional work either in adding to the insufficiently filled cartons, or in removing the same and emptying the contents back into the hopper of the filling machine.

The present invention is concerned particularly with a nozzle for an ice cream package filling machine which traps the flow of ice cream out of the nozzle for a sufficient period to permit automatic feed of the cartons one by one under the nozzle, the flow of ice cream being trapped but not stopped at any point. Such handling of the ice cream permits maintenance of substantially uniform pressure on the ice cream and a substantially continuous rate of flow thereof so that it becomes a simple matter to insure accurate filling of the cartons.

The main object of the invention is to provide an ice cream carton filling nozzle, which will be operative in properly timed relation to carton movements to temporarily trap the flow of ice cream out of the nozzle so as to prevent discharge of the ice cream outside of the confines of a carton during the feed of cartons to and from the nozzle. Another object of the invention is to provide nozzle mechanism of the character indicated which will be of simple construction and which may easily be maintained in a clean and sanitary condition. Other objects and advantages of the invention will be understood by reference to the following specification and accompanying drawing wherein there is illustrated a nozzle embodying a selected form of the invention together with a diagrammatic illustration of its application.

In the drawings:

Fig. 1 is a plan of a typical carton feed arrangement for delivering cartons to filling position under an ice cream filling machine nozzle;

Fig. 2 is a side elevation of the mechanism shown in Fig. 1, and

Fig. 3 is a vertical section through the nozzle portion of the filling mechanism.

In one typical form of carton handling mechanism, a series of ice cream cartons, respectively designated 1, are advanced to a feed mechanism or conveyor 2, which propels the cartons step by step in a direction at right angles to the series being fed to the conveyor. The conveyor 2 is typified by a table portion in which there is set a reciprocating bar 3, which carries spring pressed pawls 4 which are adapted to engage the cartons 1 to feed them step by step into filling position under a nozzle 5 of an ice cream filling machine. The means for feeding the series of cartons 1 to the conveyor 2 and the means for reciprocating the feed member 3 may be of any suitable form, many of which are well known in the art. During the travel of the cartons 1, they may be held down by an overlying pressure strip 6 and, on the conveyor 2, by means of side guides 7—7 which overlie the top side edges of the receptacles. The arrangement for holding the cartons down may, of course, be varied to suit the particular type of carton being fed.

When the carton in the filling position represented at 1A is filled and the next carton represented at 1B is to be advanced to the filling position, it is necessary to prevent ice cream from flowing into the space between the cartons 1A and 1B. It is desirable that this be effected without actually stopping the flow of ice cream through the filling machine nozzle into which the ice cream is fed under pressure.

In order to trap the flow of ice cream without actually stopping the same, there is provided an improved nozzle construction best shown in Fig. 3 wherein a conventional tubular nozzle 8 is shown depending from a hopper or receptacle 9. The ice cream may flow into and through the nozzle 8 under the pressure resulting from the weight of ice cream in the hopper or the pressure may be developed by suitable pumping mechanism. The nozzle 8 may be a plain circular or rectangular nozzle, it being shown here in rectangular form.

On the nozzle 8 there is mounted a sleeve 10, the sleeve being vertically slidable on the outside of the nozzle. At the upper end of the sleeve 10 there is provided a flanged collar 11 for cooperating with a roller carried by one end of a lever 12 pivoted intermediate its ends as indicated at 13 (Fig. 2), the other end of the lever 12 being connected by means of a link 14 to a crank 15. The crank 15 may be carried by any conveniently accessible rotating shaft part of the carton feeding mechanism and it should, of course, be so placed on the shaft that reciprocation of the sleeve 10 will be in properly timed relation to the feed movement of the cartons.

Referring again to Fig. 3, it will be seen that the lower end of the sleeve 10 is provided with valve means comprising a pair of gates 16 and 17, which are respectively pivoted as indicated at 18 and 19 on the lower end portions of the sleeve. On the pivot pins 18 and 19 of the gates, there are provided gears or gear segments 20 and 21, which respectively mesh with racks 22 and 23 formed in the forked lower end portion of a member 24. The member 24 is vertically slidably mounted on the outside of the sleeve 10 by means of a stem 25 rigidly secured to the member 24 and slidably mounted in a bearing boss 26 carried on the outside on the sleeve 10. In addition, the member 24 may be slotted as indicated at 27 to receive a headed guide pin 28 which projects from the side of the sleeve 10.

When the sleeve 10 is moved downwardly to its lowermost position, the lower ends of the racks 22 and 23 engage stops 29 and 30 which cause the member 24 to move upwardly relative to the sleeve 10 thereby imparting rocking motion to the gears or segments 20 and 21 and to gates 16 and 17. Upward movement of the member 24 relative to the sleeve thus serves to rock the gates 16 and 17 from closed position shown in dotted lines to the open position shown in full lines in Fig. 3. This opening of the valve plates 16 and 17 is effected at the end of the downward movement of the sleeve 10.

Upon upward movement of the sleeve, the member 24 and the gates 16 and 17 remain in the position illustrated in Fig. 3 until the upper end 31 of the stem 25 engages a stop 32 which effects downward movement of the stem 25 and member 24 relative to the sleeve 10 during the terminal portion of the upward movement of said sleeve. Such relative downward movement of the member 24 rocks the valve plates 16 and 17 to the closed position illustrated in dotted lines over the lower end of the sleeve 10. At the same time that the gates 16 and 17 reach their closed position, the sleeve 10 starts its downward travel which is preferably effected at about the same speed that the ice cream flows downwardly through the nozzle 5.

The ice cream, being a relatively thick and not too freely flowing liquid, is effectively retained or trapped in the sleeve 10 during its downward movement without any leakage. During the time that the sleeve 10 is moving downwardly with its gates 16 and 17 closed, the conveyor 2 is actuated to feed a filled carton from under the nozzle and to deliver an empty carton in filling position. By the time the sleeve 10 reaches the position where the gates 16 and 17 commence to open, an empty carton will have been delivered in place to receive the ice cream which will flow out of the sleeve 10. While the carton is being filled, the sleeve 10 moves upwardly so that by the time the proper amount of ice cream has been discharged into the carton, the gates 16 and 17 will automatically be closed with the sleeve in its upper position. Thus the flow of ice cream through the nozzle tube 5 is in effect continuous although intermittently trapped within the sleeve 10.

The stem 25 of the valve operating mechanism may be provided with a pair of recesses 33 and 34 for cooperation with a spring pressed detent 35 carried by the bearing boss 26. The spring pressed detent 35 is operative to releasably hold the stem 25, the valve operating member 24, and the valve plates 16 and 17 in closed and open positions respectively so that the valve plates 16 and 17 remain open during the upward movement of the sleeve 10 and closed during the downward movement thereof.

The extent of vertical movement of the sleeve 10 may, of course, be adjusted by adjusting the throw of the crank 15 or by adjusting the location of the pivot 13 for the lever 12. Instead of employing the crank for effecting vertical movement of the sleeve 10, various cam means well understood by skilled mechanics may be substituted and such cam means may be so designed as to substantially eliminate the variation in speed of travel of the sleeve which results from the crank actuation thereof. Also, the stops 29, 30 and 32 may be adjusted vertically to cooperate with the respective parts of the member 24 in the various extents of travel of the sleeve 10. The stops 29, 30 and 32 may be adjustably mounted on brackets or other conveniently accessible means provided on the filling machine. Various changes in the arrangement may be made without departing from the invention.

I claim:

In filling mechanism of the class described, the combination of a nozzle tube, a sleeve slidably mounted on said tube and extending beyond an end thereof, valve means adjustable from closed position to open position on the extended end of said sleeve, means effecting reciprocation of said sleeve to alternately project and retract said sleeve relative to said tube, means for opening said valve means at the end of the projecting stroke of said sleeve, means for closing said valve means at the end of the retracting stroke of said sleeve; and means for maintaining said valve means open during substantially all of the retractive movement of said sleeve, and closed during substantially all of the projecting movement thereof.

FRANK D. PALMER.

REFERENCES CITED

The following references are of record in the file of this patent:

UNITED STATES PATENTS

| Number | Name | Date |
|---|---|---|
| 286,782 | Colbert | Oct. 16, 1883 |
| 676,048 | Price | June 11, 1901 |
| 1,000,547 | Parshall | Aug. 15, 1911 |
| 1,007,358 | Joplin | Oct. 31, 1911 |
| 1,045,391 | Graf | Nov. 26, 1912 |
| 1,647,232 | Kiefer | Nov. 1, 1927 |
| 1,881,106 | Vogt et al | Oct. 4, 1932 |
| 2,136,224 | Weinreich | Nov. 8, 1938 |
| 2,376,289 | Stenglein | May 15, 1945 |